United States Patent
Epworth

(12)
(10) Patent No.: US 6,400,496 B1
(45) Date of Patent: Jun. 4, 2002

(54) OPTICALLY AMPLIFIED WDM TRANSMISSION SYSTEM

(75) Inventor: Richard Edward Epworth, Herts (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/083,469

(22) Filed: May 22, 1998

Related U.S. Application Data

(63) Continuation-in-part of application No. 08/869,788, filed on Jun. 5, 1997, now abandoned.

(51) Int. Cl.[7] .................... H04B 10/17; G02B 5/32; H01S 3/07
(52) U.S. Cl. .................. 359/337.1; 359/174; 372/31
(58) Field of Search ................... 359/128, 130, 359/174, 194, 337–339, 334, 337.1, 337.21; 372/23, 29, 31; 385/5, 10

(56) References Cited

U.S. PATENT DOCUMENTS

| | | | | |
|---|---|---|---|---|
| 4,921,335 A | * | 5/1990 | Ditman, Jr. ................ | 359/174 |
| 5,271,024 A | * | 12/1993 | Huber ........................... | 372/6 |
| 5,414,540 A | * | 5/1995 | Patel et al. .................... | 359/39 |
| 5,691,989 A | * | 11/1997 | Rakuljic et al. ............... | 372/20 |
| 5,740,292 A | * | 4/1998 | Strasser ........................ | 385/37 |
| 5,841,500 A | * | 11/1998 | Patel ........................... | 359/122 |
| 5,936,980 A | * | 8/1999 | Espindola et al. ............ | 372/27 |
| 6,081,632 A | * | 6/2000 | Yoshimura et al. ........... | 385/5 |
| 6,175,436 B1 | * | 1/2001 | Jackel ......................... | 359/179 |

FOREIGN PATENT DOCUMENTS

| | | | |
|---|---|---|---|
| EP | 883255 | * | 12/1998 |
| WO | 97/50157 | * | 6/1997 |

\* cited by examiner

*Primary Examiner*—Nelson Moskowitz
(74) *Attorney, Agent, or Firm*—Lee, Man, Smith, McWilliams, Sweeney and Ohlson

(57) ABSTRACT

The problem of gain tilt in an optically amplified WDM system is avoided by using SBS (Stimulated Brillouin Scattering) to limit the power levels of the individual WDM channels at the outputs of at least selected amplifiers in the transmission path. The SBS limits the power by the creation of a dynamic amplitude Bragg reflective grating. Alternative mode of creating such gratings are also described, one relying upon the Kerr effect, and another relying on creating a thermal grating in a medium, such as a liquid crystal that exhibits a refractive index that is strongly temperature sensitive.

8 Claims, 5 Drawing Sheets

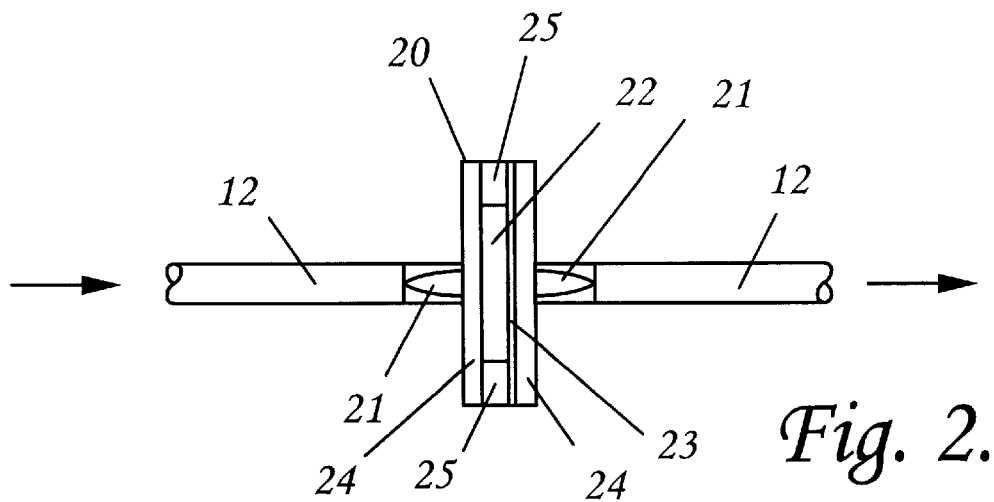
Fig. 2.
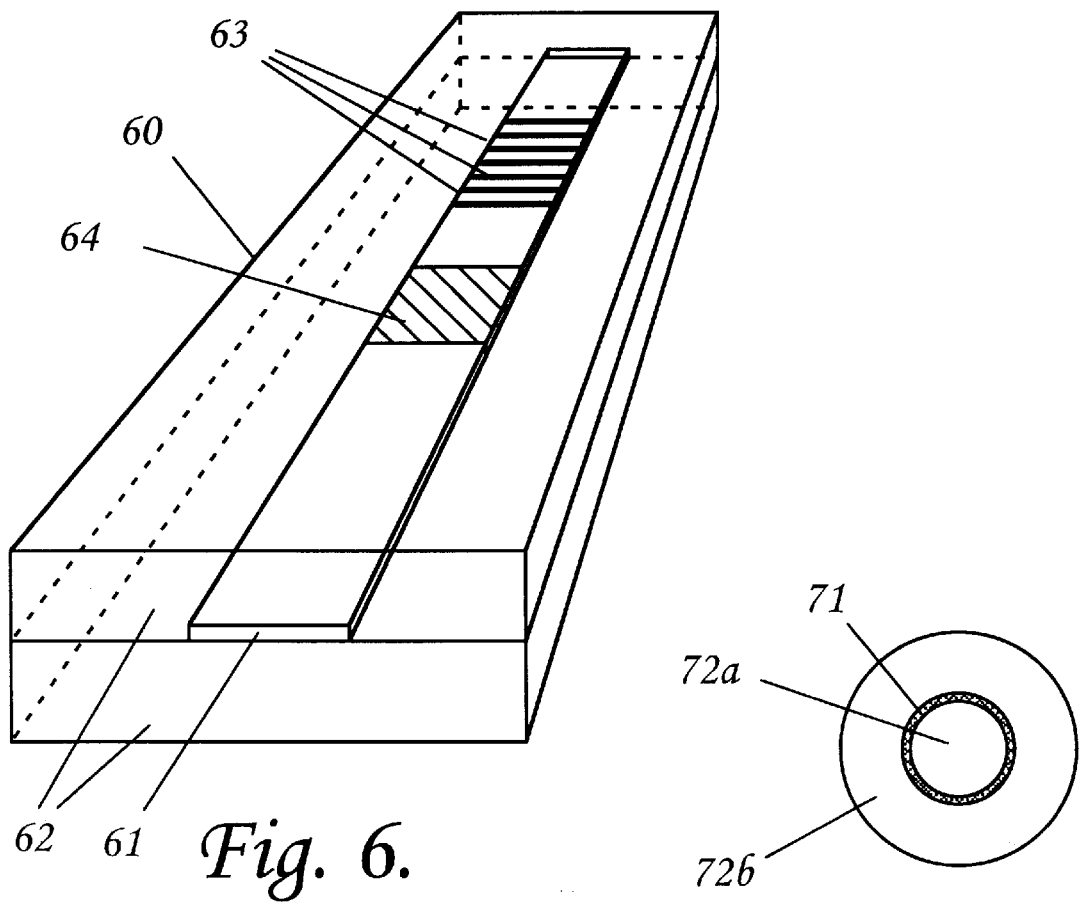
Fig. 6.
Fig. 7.

OPTICALLY AMPLIFIED WDM TRANSMISSION SYSTEM

This application is a continuation-in-part of U.S. patent application Ser. No. 08/869,788, filed Jun. 5, 1997, now abandoned.

BACKGROUND TO THE INVENTION

The phenomenon of dynamic gain tilt, particularly that exhibited by erbium doped optical amplifiers, presents problems in the transmission of wavelength division mutiplexed signals along a common highway that contains such amplifiers. In such a transmission system it is desirable for the channel powers to be substantially balanced, otherwise, in respect of the strong channels, there are liable to be problems associated With non-linearity effects, while in respect of the weak channels, there are liable to be problems associated with poor signal to noise ratio. In systems of the future, the introduction of optical drop/insert and optical routing/crossconnects will lead to much greater problems of power imbalances between channels.

One attempt at a solution to this problem is described in the specification of U.S. Pat. No. 5,452,116. This involves the use of spatially separated amplifiers at intervals along the highway where the different channels are demultiplexed, separately amplified, and remultiplexed again. This approach becomes increasingly unattractive to implement as the number of channels is increased. Additionally it relies upon using preset wavelength filters to break up the full WDM band into independent regions. This inevitably means that there must be spectral deadbands between adjacent regions, which is wasteful of available spectrum. Some degree of alleviation of the problem is alternatively achieved by the use of multi-core erbium fibre so as to obtain some flattening of the erbium gain characteristic. This is for instance described by M Zervas et al. in the paper entitled, 'Twin-Core Fiber Erbium-Doped Channel Equalizer', Journal of Lightwave Technology, Vol. 13, No. 5, May 1995, pages 721–731. A further alternative is to cool the erbium fibre to give some independence of gain and saturation across the band, as reported by E Goldstein et al. in the paper entitled, 'Inhomogeneously Broadened Fiber-Amplifier Cascades for Transparent Multiwavelength Lightwave Networks', Journal of Lightwave Technology, Vol. 13, No. 5, May 1995, pages 782–790. However the effect is of limited practical scope, and cooling of this sort is undesirable additional expense.

SUMMARY OF THE INVENTION

It is an object of the present invention to provide a component for use in a WDM environment which limits the power output from the component of individual channels. It is to be noted that this is not the same as wanting constant optical gain across the full WDM band. Additionally it is an object that the component shall allow the channels to be located anywhere in the full WDM band, rather than to be confined within specific predetermined windows in the band. In essence this means that the incoming signal shall define the channel whose output power is to be limited.

According to the present invention there is provided an optically amplified optical transmission system in which a plurality of optical channels are caused to propagate in wavelength division multiplexed form along a common transmission path, which transmission path includes photorefractive reflection grating generation means adapted, in response to receipt of power in any of said channels in excess of a predetermined power limit, to create and sustain, for the duration of said receipt of power, a Bragg reflection grating having a bandwidth extending the full spectral width of the channel, whereby a power-per-channel saturation limit is applied to the transmission path.

One way of generating the required photorefractive reflection gratings is by means of stimulated Brillouin scattering (SBS). An alternative way relies upon creating a grating through the agency of the Kerr effect, and another through creating a thermal grating, for instance in a liquid crystal medium.

The invention also provides, in an optically amplified optical transmission system in which a plurality of optical channels are caused to propagate in wavelength division multiplexed form along a common transmission path, a method of applying a saturation power limit to the optical power transmitted through said transmission path by using optical power launched into said transmission path to control the reflectance of a dynamic reflectance reflector located in said transmission path.

According to a further aspect of the invention there is provided a method of balancing channel power in a wavelength division multiplexed optically amplified transmission system, said system having a transmission path carrying a plurality of wavelength division multiplexed channels, said system including dynamic reflectance reflection grating generation means, said method comprising generating the dynamic reflectance reflection grating in the system in response to an out-of-balance power level in a channel, and balancing, by means of said generated grating, the power in that channel towards the power per channel of other channels propagating in said transmission path.

BRIEF DESCRIPTION OF THE DRAWINGS

There follows a description of laser assemblies embodying the present invention in preferred forms. The description refers to the accompanying drawings, in which:

FIG. 2 is a schematic diagram of a specific alternative form of the photorefractive reflection grating generation means of FIG. 1, FIGS. 3, 4 and 5 are computed plots of various characteristics of the photorefractive reflection grating generation means of FIG. 2, and FIG. 7 is a schematic diagram of another specific alternative form of the photorefractive reflection grating generation means of FIG. 1.

DETAILED DESCRIPTION OF PREFERRED EMBODIMENTS

Figure 1:
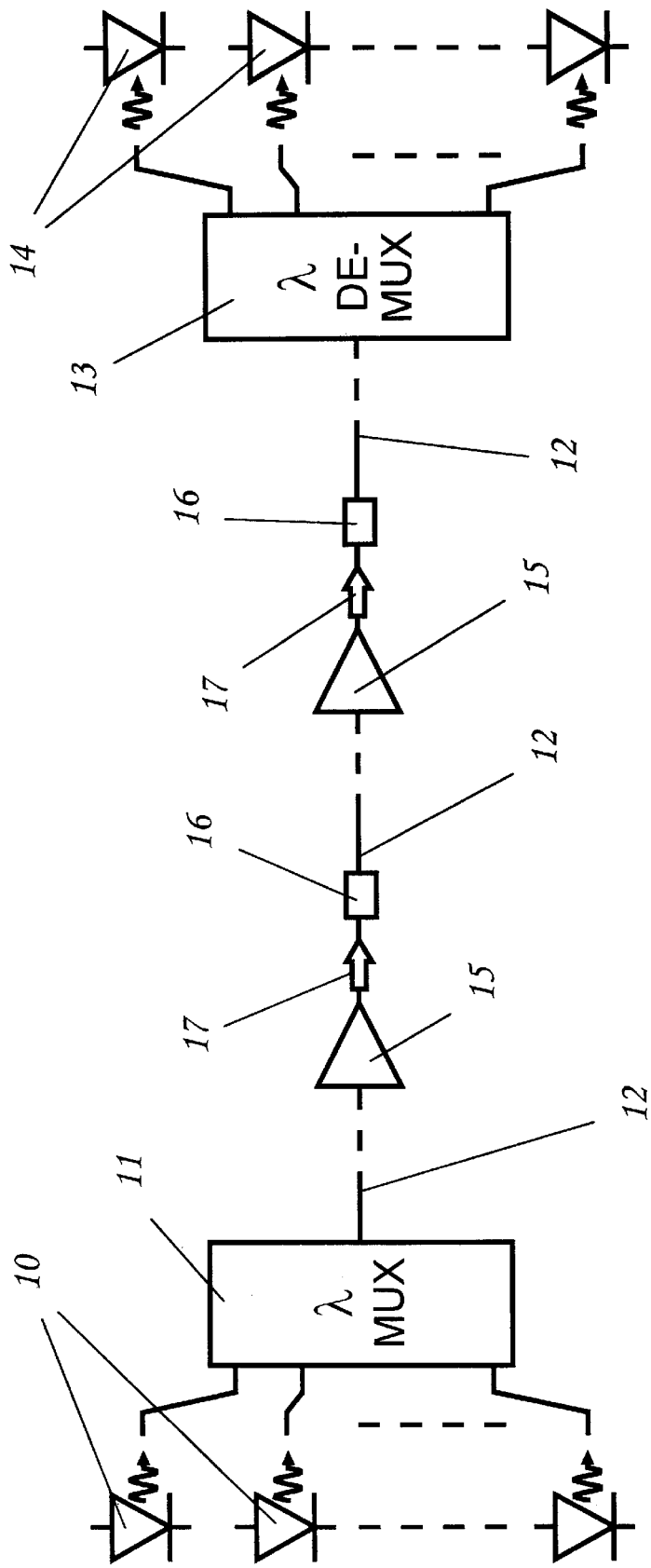
FIG. 1 is a schematic diagram of a WDM transmission system having a data highway incorporating one or more optical amplifiers and photorefractive reflection grating generations means.

The first of the preferred embodiments to be described employs stimulated Brillouin scattering (SBS), a phenomenon that is conventionally seen as detrimental to the operation of optical transmission systems. It is conventional practice to avoid significant SBS because SBS typically causes errors in the transmitted signal when a significant fraction of the power is reflected by SBS. This avoidance is achieved by limiting the power launched into the system fibre to a value below the SBS threshold. In contrast, this embodiment relies on operating in a higher power regime, one in which the power reflected by the signal induced grating (SBS) is significant, and is employed as a mechanism to limit the forward propagating signal power. Referring to FIG. 1, a WDM transmission system has a number of transmitters 10 whose outputs are wavelength division multiplexed by a multiplexer 11 on to a common highway 12. At the far end of the highway a demultiplexer 13 demultiplexes the channels, and feeds them to individual detectors 14. The highway 12 includes one of more optical amplifiers 15, and one or more optical photorefractive reflection grating generation means 16 with associated isolators 17 for disposing of the optical power that they reflect. A reflection grating generation means 16 in this instance is constituted by an optical waveguide, typically an optical fibre, in which the stimulated Brillouin scattering is induced. When optical fibre is employed, this fibre may be constituted by special fibre for the purpose, or by fibre that constitutes part of the highway 12.

To facilitate an understanding of how SBS is put to good use in the present invention, it may be instructive to consider first the problems that SBS can give rise to.

First falling to be considered is what happens in respect of continuous unmodulated power. Above a certain threshold power level (the SBS threshold) a photorefractive grating is formed in an optical fibre that carries high power. Typically this is liable to arise in about the first 15 km of fibre downstream of a high power optical amplifier. This grating is initiated by spontaneous backward Brillouin scattering, which beats with the forward propagating power to produce a "standing" wave which pumps the forward propagating acoustic wave (~11 GHz), which is matched with the Bragg wavelength, and so further reinforces the backward scattered Brillouin wave. Above the threshold, the more power that is launched; the stronger is the grating. The effect thus leads to a strong saturation of the forward power. The extra power is not transmitted, but instead gets reflected back up the fibre. This reflected power is frequency shifted down by about 11 GHz because it is reflected off a grating that is travelling forward along the fibre at the speed of sound (Doppler shift) in the fibre.

Next to be considered is what happens if the optical signal launched into the fibre is amplitude modulated. Though the gratings formed are several kilometers long, they have a bandwidth corresponding to a much shorter distance. The relatively high acoustic loss in the fibre ensures that the grating is not coherent over several kilometers but has, for standard transmission fibre, a response typically broadened to about 40 MHz (at 1550 nm) by the phonon lifetime of the acoustic mode. Accordingly, the Brillouin mechanism typically has a characteristic linewidth which is narrow compared with the signal bandwidth of high bit rate systems, but wider, or comparable with, the bandwidth of lasers operated cw for external modulation. Typically wavelength multiplexed transmission systems are operated with individual channel bandwidths significantly greater than 40 MHz. With amplitude modulation, the strongest spectral component is the carrier, and so it is the carrier, together with spectral components of the data that fall within the Brillouin bandwidth, that are the first to go. For such data modulated signals it is seen therefore that SBS reflects power in a spectrally non-uniform manner. This leads to patterning and eye closure. The phenomenon can alternatively be described in terms of time domain. The SBS threshold for high frequency modulation is raised because it does not lie within the Brillouin bandwidth of the grating created by the carrier.

Two strategies are in principle possible for dealing with this source of spectral non-uniformity. One is to alter the structure in which Brillouin scattering is promoted in such a way as to broaden its spectral response. The problem with this approach is that such spectral broadening is accompanied by a corresponding increase in the Brillouin threshold power. The alternative strategy is to limit the bandwidth of the signals being transmitted so as to ensure that they do not extend beyond the characteristic linewidth of the Brillouin scattering. It is the latter approach which is adopted in the first embodiment of the invention to be described with reference to FIG. 1. In this instance each channel transmitter 10 is therefore restricted to a bandwidth typically of not more than 30 MHz.

Greater bandwidth of individual channels of the system can be provided by using a mechanism other than Brillouin scattering to generate the requisite photorefractive reflection grating of gratings.

A particularly simple alternative way of providing such gratings will now be described with particular reference to FIG. 2 in association with FIG. 1. In this instance the reflection grating generation means 16 of FIG. 1 is constituted by a cell 20 inserted into the highway 12 with the aid of a pair of collimating lenses 21, typically graded index lenses. The cell 20 contains a medium 22 exhibiting a relatively high Kerr effect constant, typically but not necessarily a liquid crystal material, and also a partial reflector 23. In the case of a liquid phase medium 22, this may be contained between a pair of transparent plates 24 secured together with a perimeter seal 25. The partial reflector 23 serves to set up an optical standing wave in the medium 22, which may typically be not more than a few millimeters thick. This standing wave provides regions of enhanced refractive index (or diminished, according to the sign of the Kerr constant) at the electric field vector antinodes of the standing wave. These regions, being interspersed with regions registering with the electric field vector modes, where the refractive index remains unchanged, thus co-operate to constitute a Bragg reflective grating. If the reflectivity of the partial reflector 23 is R, and if the light intensity launched into medium 22 is $I_f=E_f^2$ (where Ef is the forward field), then the reflected intensity is $I_r=E_r^2=I_fR$ (where $E_r$ is the reflected field). Accordingly the intensity at the standing wave antinodes is $(E_f+E_r)^2$, while at the nodes it is $(E_f-E_r)^2$. Therefore the difference between the intensity at the antinodes and that at the nodes is $4I_fR^{1/2}$. By way of example, a partial reflectivity R=10% will produce an intensity variation from peak to trough of approximately 1.2 times the launch intensity. So despite introducing an excess loss of only 10%, the peak to trough index modulation is no smaller than the mean change in index produced by the mean change in index produced by the light-induced Kerr effect.

The refractive index change, δn, due to the Kerr effect is related to the optical intensity, I, through an equivalent nonlinear coefficient, $\alpha_2$, $$\delta n = \alpha_2 I$$

where the units of I are W/m$^{-2}$, and those of $\alpha_2$ are m$^2$/W. For a liquid crystal cell with a nematic liquid crystal layer thickness, d, the mean orientational nonlinearity is given approximately by, $$\alpha_2 = \frac{(\Delta\varepsilon)^2 d^2}{24Kc}$$

where Δε is the birefringence of the liquid crystal, K is the elastic constant of the liquid crystal, and c is the speed of light in vacuo. (Note that this is a perturbative solution, and is not valid as d→∞.) Typical values for Δε and K are, $$\Delta\varepsilon = 0.6, K = 10^{-11}$$

newtons.

Therefore, for a cell thickness, $$d = 1 \text{ mm}$$

$$\alpha_2 = 5 \times 10^{-6} \text{m}^2/\text{W}$$

With this cell thickness, and an effective beam size through the liquid crystal having an effective cross-sectional area of $4 \times 10^4 \mu\text{m}^2$, the index change per milliwatt, $\delta n_w$, is therefore, $$\delta n_w = 0.125 \text{mW}^{-1}$$

Using the Fresnel equations, the reflectivity, $R_{Fr}$, at a single interface between media respectively of refractive index $n_1$ and $n_2$ is, $$R_{Fr} = \frac{(n_1 - n_2)^2}{(n_1 + n_2)^2}$$

For a multi-element Bragg reflective grating of N elements, the grating reflectivity, $R_{gr}$, is $N.R_{Fr}$, so $$R_{gr} = N.(\Delta n/(2n+\Delta n))^2.$$

Accordingly, for $R_{gr}=1$ and large N, $\Delta n \approx 2n/N$. Considering now the case of a Bragg grating created by light of a wavelength $\lambda=1.52\mu\text{m}$, in a liquid crystal medium of refractive index n=1.52, the Bragg pitch will be $0.5\mu\text{m}$, and therefore, if the liquid crystal layer is 1 mm thick, the grating will comprise 2000 elements. This number of elements will provide a passband fractional bandwidth $\approx 1/1000$, i.e. a bandwidth of 1.52 nm. Under typical operating conditions this is sufficiently narrow to affect only one channel, the channel that writes it, and yet be sufficiently wide to provide substantially uniform attenuation over the full spectral width of that channel. It has been shown above that the 2000 Bragg elements provide 100% reflectivity when $\Delta n/n=10^{-3}$, and therefore the liquid crystal parameters quoted above imply a sensitivity in the region of only $\approx 10\mu\text{W}$. Typically a sensitivity lower than this will be desirable, typically a sensitivity of a few milliwatts per channel, and this is readily achievable by for instance using a liquid crystal medium of reduced level of nonlinearity, or increasing the beam diameter. In principle a reduction of sensitivity can also be achieved by reducing the thickness of the liquid crystal layer, but this will not normally be desirable because, as explained above, this will also have the effect of reducing the number of elements constituting the Bragg grating, thereby increasing its reflection bandwidth. This bandwidth needs to be broad enough to provide substantially uniform attenuation over the full width of the channel that generates it, but increasing the width beyond this point will mean that the spectral spacing between adjacent channels has to be increased to ensure that the bandwidth of the grating written in any one channel does no extend into the spectrum of any adjacent channel.

Figure 3:
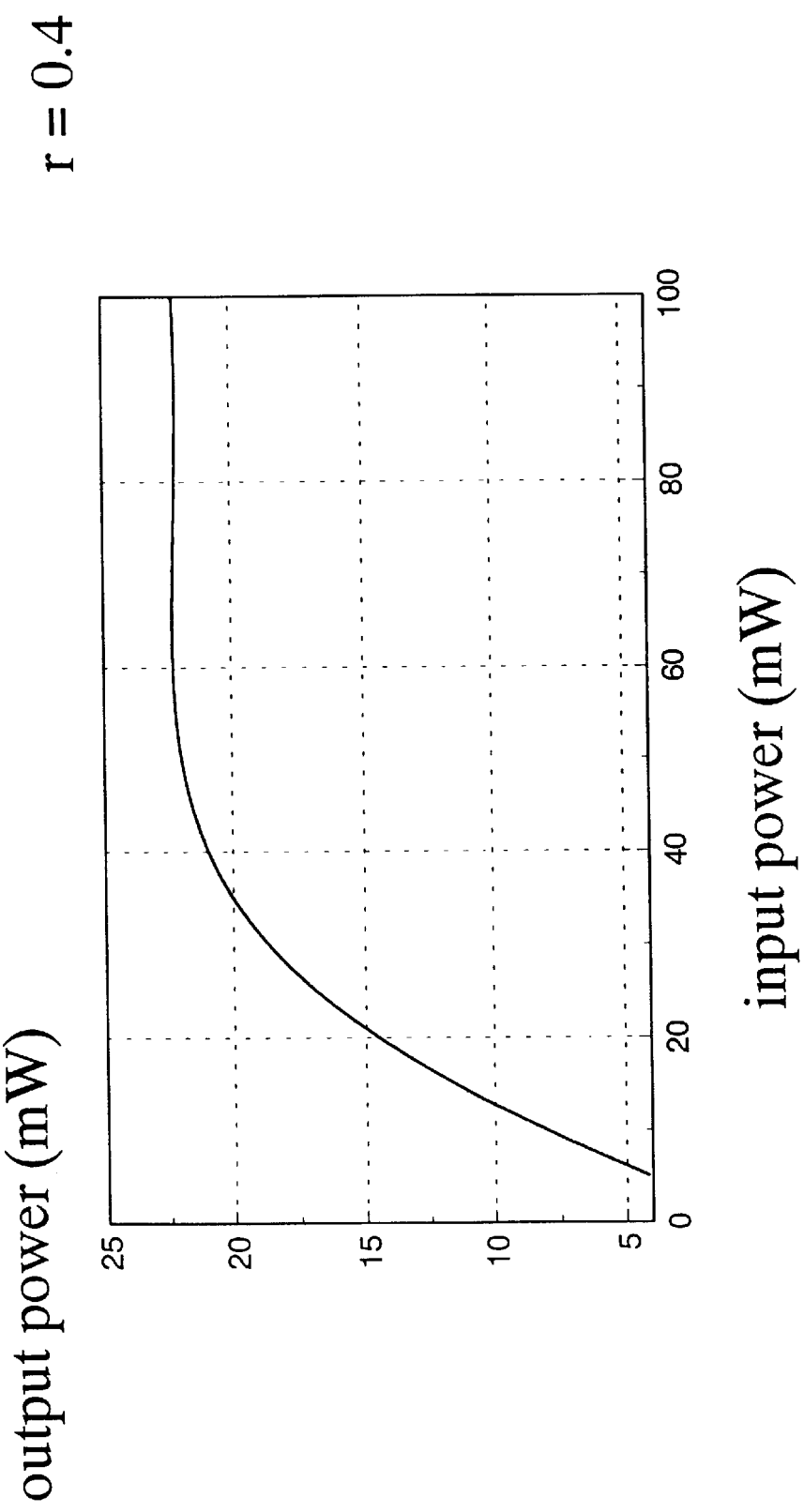
Figure 4:
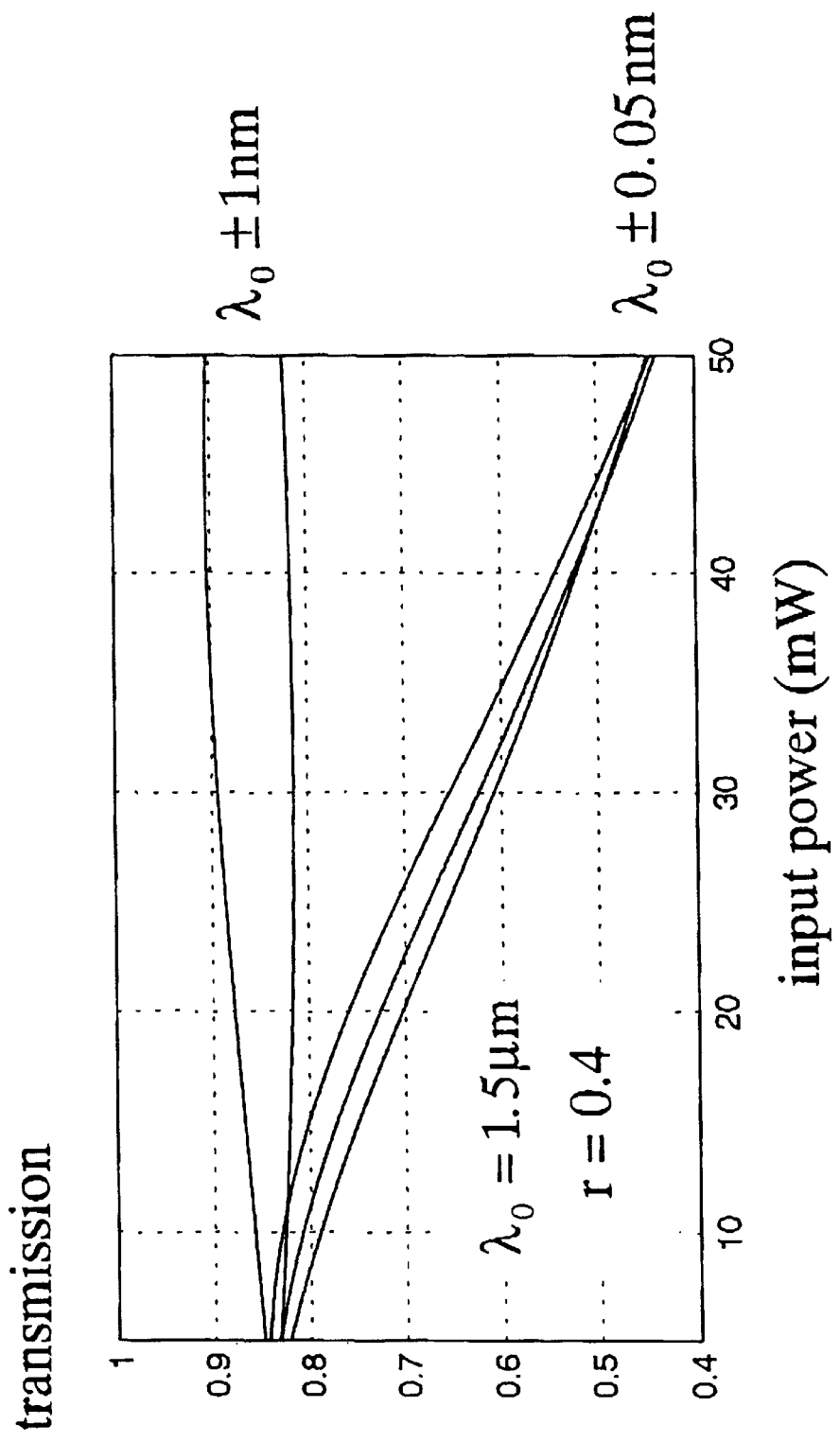
Figure 5:
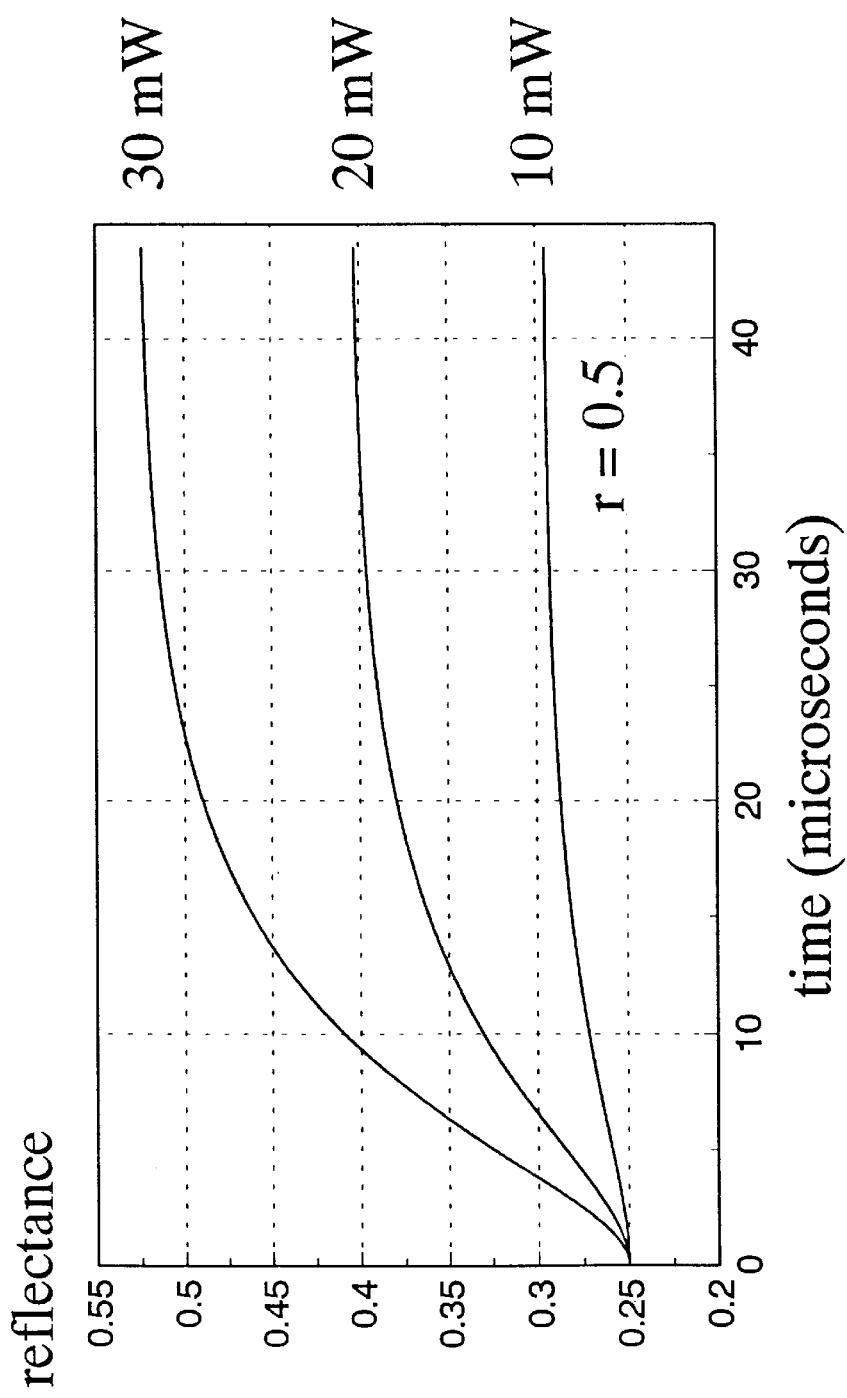

FIG. 3 depicts the computed output power as a function of input power in respect of a liquid crystal cell 20 having a liquid crystal layer thickness of 1.0mm The liquid crystal medium 22 is assumed to have a refractive index of 1.8 and a dielectric anisotropy ($\Delta\epsilon$) of 1.0. Its elastic constant (K) is assumed to be $5\times10^{-12}$ Newtons and its viscosity coefficient to be 0.01 Pascal seconds. The optical beam radius in this instance is assumed to be $4\mu\text{m}$. The actual plot of FIG. 3 is in respect of operation at a wavelength of $1.5\mu\text{m}$ with a partial reflector 23 exhibiting a field reflectivity of 0.4. The computed wavelength selectivity is evident from FIG. 4, which shows the transmission of the cell 20 (with the parameters specified in this paragraph) as a function of input power at a wavelength=$1.5\mu\text{m}$ for the five wavelengths $\lambda_0$, $\lambda_0 \pm 0.05$nm and $\lambda_0 \pm 1$nm. FIG. 5 depicts, for three different values of input power, the transient response of the cell 20 (with the parameters specified in this paragraph) when the partial reflector exhibits a field reflectiveity of 0.5.

A third way of generating the requisite photorefractive effect reflection grating or gratings also relies on the use of a partial reflector to create an optical standing wave, but in this instance at least the primary function of the standing wave is to create a thermal grating through the agency of optical absorption. This thermal grating is created in a medium whose refractive index is a strong function of temperature, typically a material in the class of liquid crystalline materials, for instance a liquid crystal polymer. The thermal grating has a relatively fine pitch, and therefore needs to be formed in a correspondingly thin layer so that the thermal grating can be sustained in the face of thermal conduction effects.

In FIG. 6 the reflection grating generation means 16 of FIG. 1 is formed in a length of planar waveguide 60 constituting a part of the common highway 12 of FIG. 1. This planar waveguide has a core 61 surrounded on all sides by lower refractive index cladding material 62. The waveguide is provided with a partial reflector, which may take the form of a Bragg reflector with Bragg elements 63. This is a permanent, invariant reflecting device that reflects a constant proportion of the signal power. Its purpose is to "seed" the formation of a Bragg reflector, and is not to be confused with the dynamic Bragg reflection grating whose reflectivity is variable, and which is employed for dynamic power limitation purposes. This dynamic Bragg reflection grating is formed in a short section 64 of the core 61. This short section 64 of the core is made of a material, such as a liquid crystal polymer, whose refractive index is a strong function of temperature, and which also exhibit a certain optical absorption over the entire signal transmission band of the transmission system. The forward propagating light interacts with the light reflected by the Bragg grating 63 to form a standing wave. In the section 34 this standing wave creates a thermal grating by virtue of the optical absorption, and associated with this thermal grating is a refractive index grating. The strength of reflection provided by this refractive index grating is determined by its modulation depth, which is determined by the modulation depth of the thermal grating, which in its turn is determined by the signal strength.

An approximate expression for the thermal nonlinearity is given by, $$\alpha_2 = \frac{\alpha \Lambda^2}{4\pi^2 \rho C D} \left(\frac{dn}{dT}\right)$$

where $\alpha$ is the optical absorption coefficient, $\Lambda$ is the thermal diffusion length, $\rho$ is the density of the liquid crystal, C is the specific heat and D is the diffusion coefficient. The temperature dependence of the refractive index is dn/dT. Typical values for these parameters are $\alpha=1\text{cm}^{-1}, \Lambda=20\text{mm}, \rho=1\text{g cm}^{-3}, C=2\text{J g}^{-1}\text{K}^{-1}$, and $D=2\times10^3 \text{cm}^2 \text{s}^{-1}$. The temperature dependence $dn/dT\approx 10^{-3}\text{K}^{-1}$. With these values it is seen that the thermal coefficient, $$\alpha_2 \approx 2.5 \times 10^{-12} \text{m}^2\text{W}^{-1}.$$

This is very much smaller than the equivalent orientational coefficient discussed above, but it is still large compared with the coefficients of most other nonlinear materials.

To obtain an effect of appropriate magnitude, it will typically be necessary to increase the absorption coefficient in comparison with the orientation version and to decrease the cross-sectional area of the beam size where the effect is taking place so as to increase the optical power density.

In the arrangement of FIG. 7 the place of the planar waveguide configuration of FIG. 6 is taken by an annular waveguide structure in which an annular core region 71 is bounded internally and externally by lower refractive index cladding regions 72a and 72b. In other respects the arrangement of the FIG. 7 arrangement operates in the same manner as that of FIG. 6.

Assuming that the transmission path of the common highway 12 of FIG. 1 is constituted by optical fibre, some form of coupling device sill be required at each end of the planar waveguide of FIG. 6 to effect efficient coupling of power into and out of that waveguide. Devices of this sort are well known for launching power between the zero order mode in the fibre and the zero order mode in the planar waveguide. In the case of coupling power into and out of the annular waveguide of FIG. 7 there is required a form of mode conversion structure which will convert zero order mode power with an approximately Gaussian distribution into power in a higher order mode with an annular distribution of power. One form that such a mode converter can take is a diffractive phase element. Such elements are for instance described by M R Taghizadeh et al in an article entitled, 'Developing Diffractive Optics for Optical Computing', IEEE Micro, Vol. 14, No. 6, pp 10–18, December 1994.

What is claimed is:

1. An optically amplified optical transmission system in which a plurality of optical channels are caused to propogate in wavelength division multiplexed form along a common transmission path, which transmission path includes an optical power-per-channel limiter, which limiter includes a dynamic photorefractive reflection grating generator adapted, in response to receipt of power in any of said channels in excess of a predetermined power limit, to create and sustain, for the duration of said receipt of power, a dynamic Bragg reflection grating having a bandwidth extending the full spectral width of the channel, whereby a power-per-channel saturation limit is applied to the transmission path.

2. An optically amplified optical transmission system as claimed in claim 1, wherein the photorefractive reflective grating generator is adapted to employ stimulated Brillouin scattering to create said photorefractive Bragg grating.

3. An optically amplified optical transmission system as claimed in claim 1, wherein the photorefractive reflective grating generator includes a partial reflector adapted to create an optical standing wave in a medium providing therein an associated photorefractive grating through the agency of the Kerr effect in said medium.

4. An optically amplified optical transmission system as claimed in claim 1, wherein the photorefractive reflective grating generator includes a partial reflector adapted to create an optical standing wave in a medium providing therein an associated thermal grating though the agency of optical absorption in the medium, which thermal grating is associated with a photorefractive grating through the agency of the Kerr effect in said medium.

5. An optically amplified optical transmission system as claimed in claim 4, wherein the medium is a liquid crystal medium.

6. In an optically amplified optical transmission system in which a plurality of optical channels are wavelength division multiplexed on a common highway to propagate through a location on said highway, a method of applying a saturation power limit to the optical power transmitted through said location, which method comprises the step of using the optical power incident upon said location to control the reflectance of a dynamic reflectance reflector located at said location.

7. A method as claimed in claim 6, wherein the dynamic reflectance reflector is a Bragg reflection grating generated by photorefractive effect interaction with said incident light power.

8. A method of balancing the channel powers in a WDM optically amplified transmission system, said system having a highway carrying said channels, said system including reflection grating generation means, said method comprising generating the reflection grating in the system in response to an out-of-balance power level in a channel, and balancing the power in that channel towards the power of other channels by means of said generated grating.

* * * * *